Dec. 29, 1970    R. FREEMAN ET AL    3,551,793
FREQUENCY CONTROL MEANS FOR GYROMAGNETIC RESONANCE APPARATUS
Filed Oct. 31, 1967    5 Sheets-Sheet 1
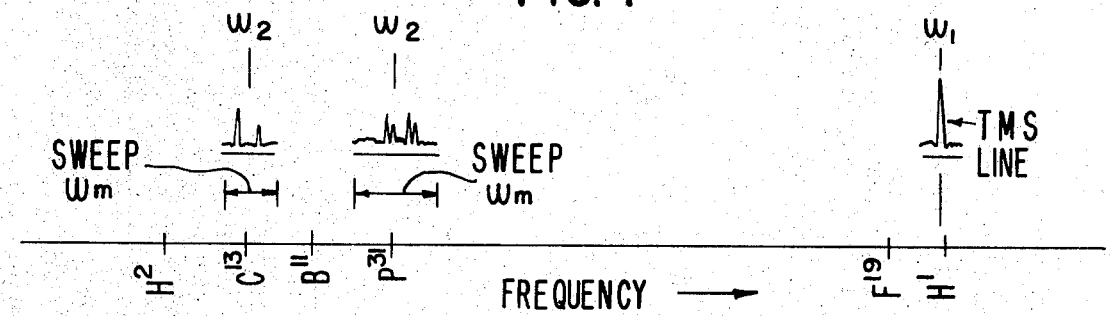
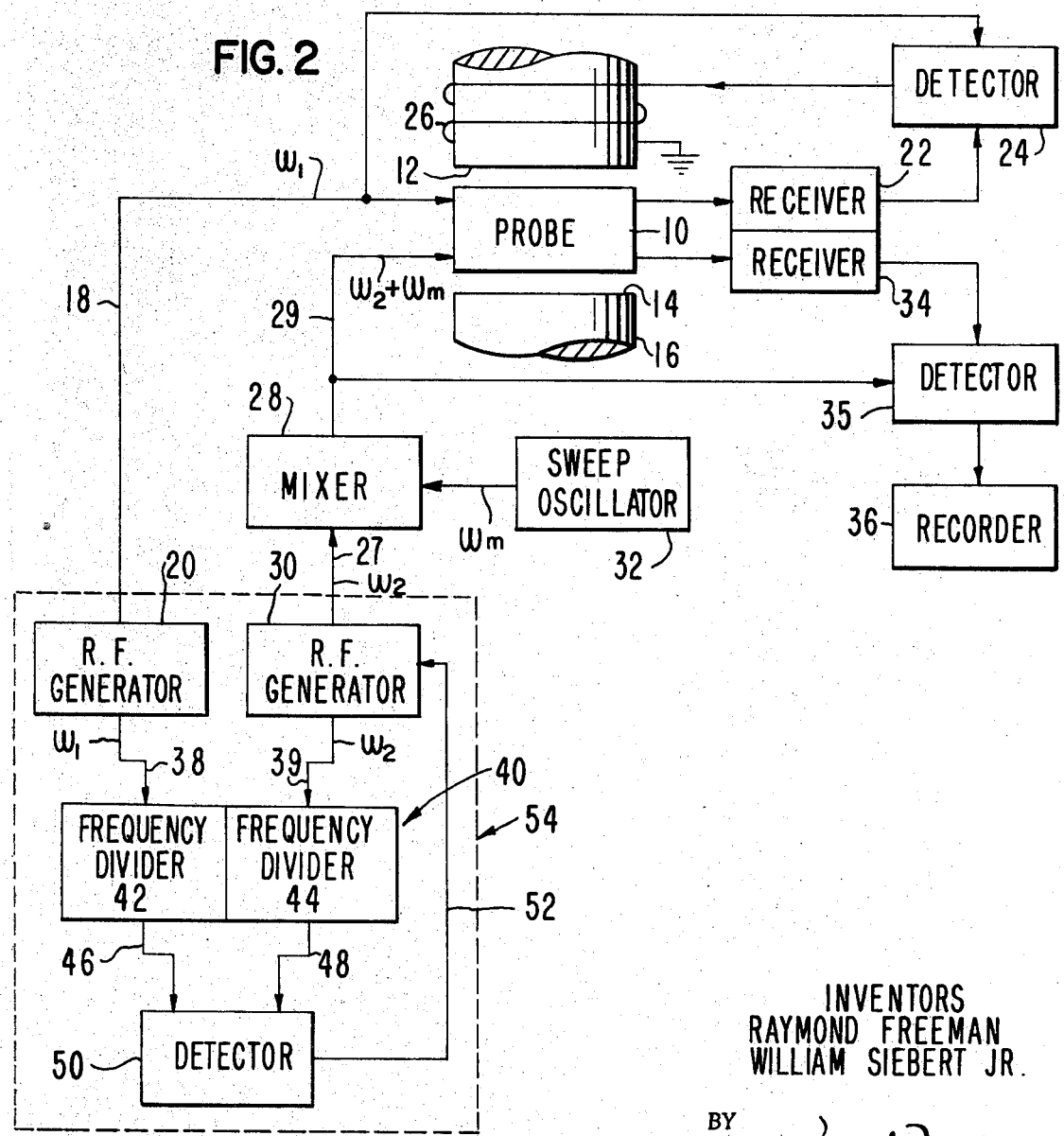
INVENTORS
RAYMOND FREEMAN
WILLIAM SIEBERT JR.
BY
*Wm. J. Nolan*
ATTORNEY

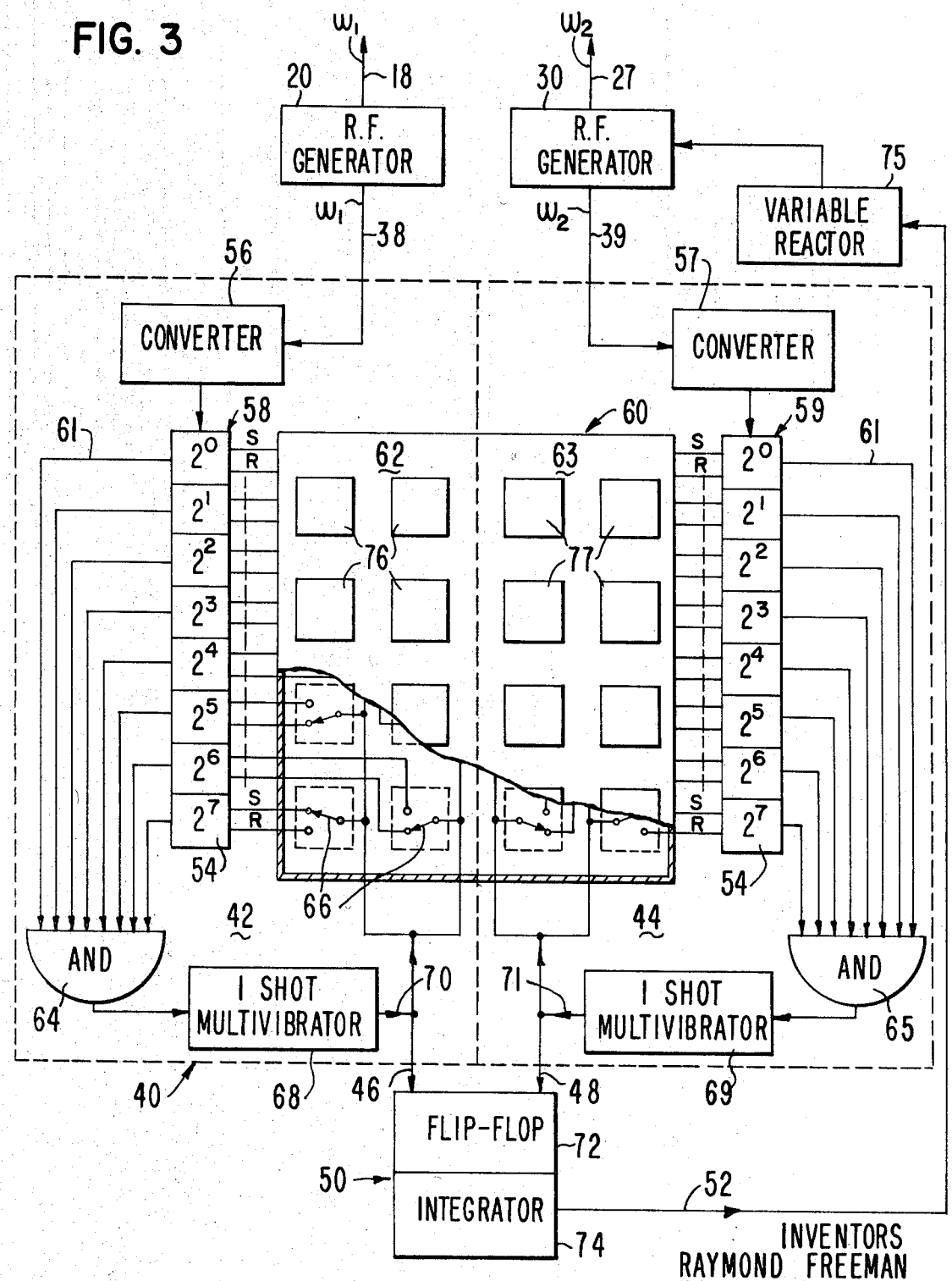

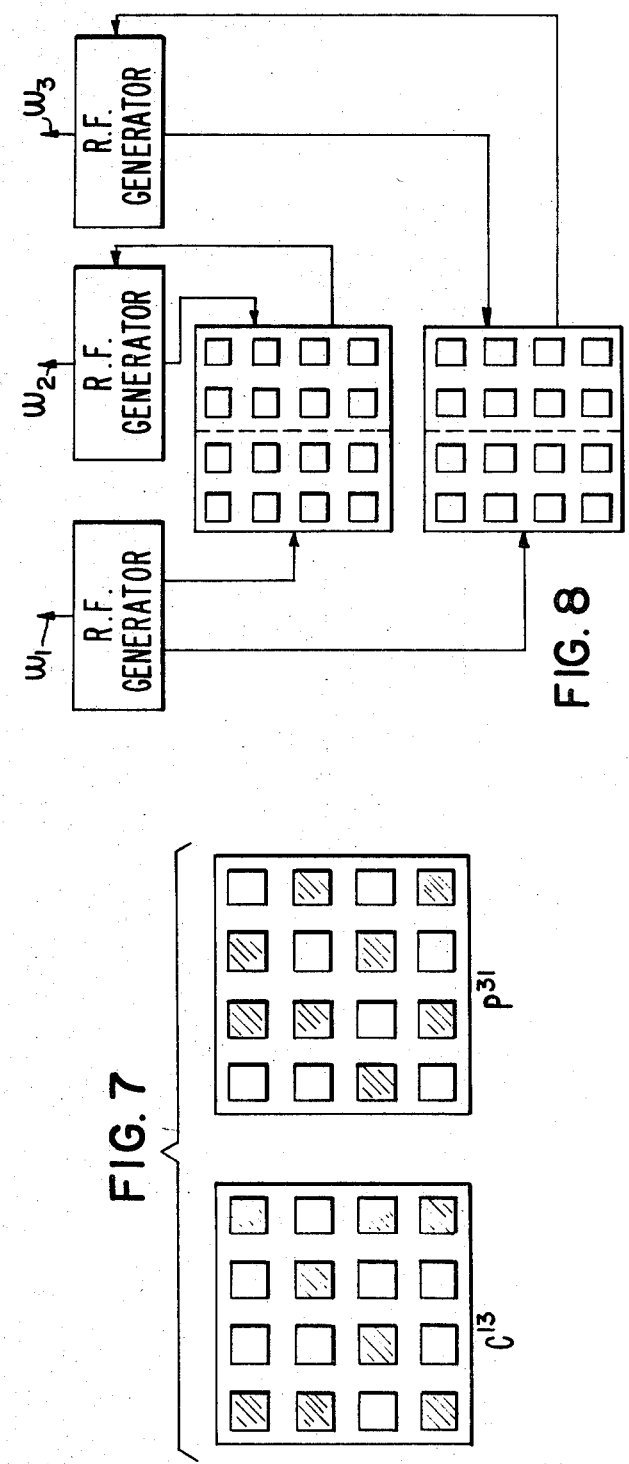

United States Patent Office 3,551,793
Patented Dec. 29, 1970

3,551,793
FREQUENCY CONTROL MEANS FOR GYRO-MAGNETIC RESONANCE APPARATUS
Raymond Freeman, Menlo Park, and William Siebert, Jr., Palo Alto, Calif., assignors to Varian Associates, Palo Alto, Calif., a corporation of California
Filed Oct. 31, 1967, Ser. No. 679,373
Int. Cl. G01n 27/78
U.S. Cl. 324—.5                                    7 Claims

ABSTRACT OF THE DISCLOSURE

A frequency selection and control apparatus is disclosed for use in a gyromagnetic resonance spectrometer system which enables the selective detection and recording of the resonance spectra of any desired nuclei using a single analytical sample. A frequency division and comparison network provides a means for selecting a particular nuclear excitation frequency and for automatically locking this frequency to the resonance frequency of a reference material.

STATEMENT OF THE INVENTION

Figure 9:
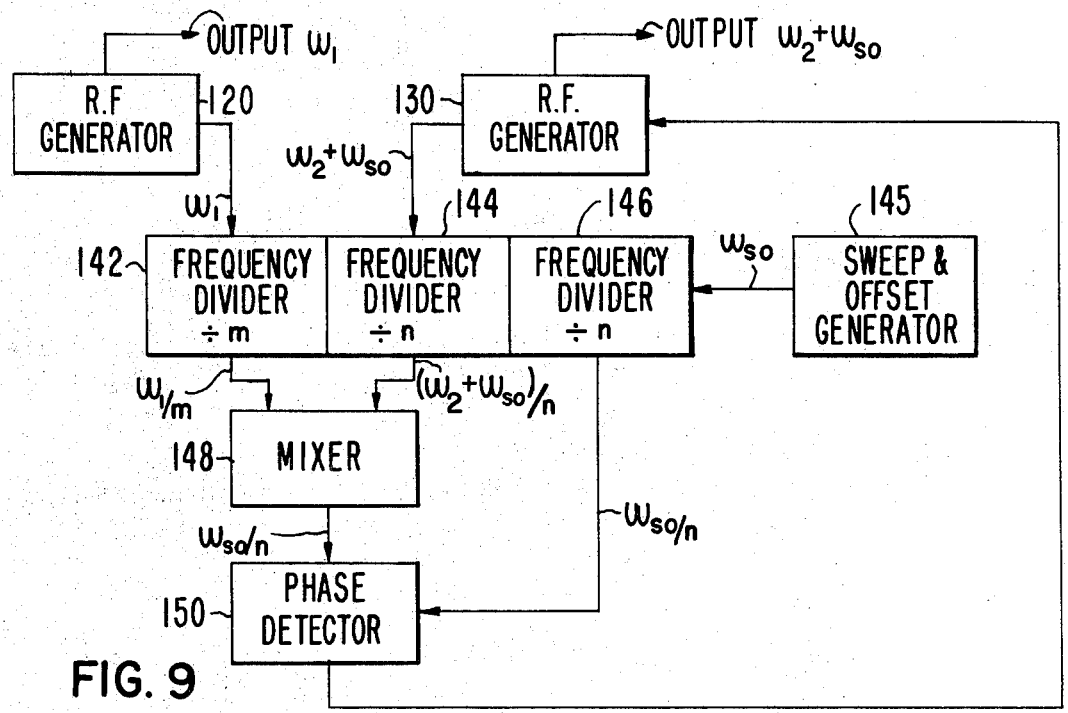

The present invention relates in general to gyromagnetic resonance spectrometers and more particularly to a novel method and apparatus for enabling the selective excitement and detection of nuclear magnetic resonance spectra of nuclei other than that of hydrogen.

DESCRIPTION OF THE PRIOR ART

In conventional gyromagnetic spectrometer apparatus analytical sample having the properties of gyroscopic moment and magnetic moment is placed in a polarizing magnetic field of intensity H and an alternating magnetic field of frequency $\omega$ is applied at an angle of 90° to the field H. One of the fields is then varied, or swept, until a resonance signal is detected by a magnetic sensing device disposed proximate to the sample. A resonance signal will occur in a sample having nuclei of a particular gyromagnetic ratio $\gamma$ when the relationship $\omega = \gamma H$ exists, where $\omega$ is the Larmor frequency and H is the magnetic field intensity at the sample.

Modern NMR apparatus, such as the Varian HA-100 may be operated in either the field-sweep mode or the frequency-sweep mode wherein either the magnetic field H or the alternating frequency $\omega$ (usually in the R.F. range) may be swept over a given portion of the resonance spectrum. This particular system incorporates field-frequency control apparatus wherein the frequency $\omega_1$ of the main R.F. source of the spectrometer and the magnetic field at the sample are held at a constant ratio. This is accomplished by a locking system wherein a reference material such as tetramethylsilane (TMS) or other material having a narrow resonance line (not necessarily a proton resonance) is added to the sample to be studied so that when the field-frequency ratio is equal to the gyromagnetic ratio of the reference material its nuclei are excited to resonance and a reference signal may be detected and used to control the magnetic field or the radio frequency. Thus, should the magnetic field or the radio frequency drift so that their ratio is no longer equal to $\gamma$ an error signal is detected to drive a servo loop for maintaining field-frequency stabilization.

A modulated second R.F. source of frequency $\omega_2$ is provided for exciting to resonance the nuclei of the analytical sample as the second frequency $\omega_2 + \omega_m$ is swept over a given range, or in an alternate method the magnetic field is modulated at $\omega_m$ and modulation sideband responses are detected. A resonance signal is then detected which is responsive to the resonant nuclei as they are excited by the second frequency and the resonance spectrum is recorded.

One problem which arises in using such a system to inspect nuclei other than those having resonance lines within a few kHz of the reference material is the difficulty of maintaining the frequency of the generators, i.e., the frequency ratio between $\omega_1$ and $\omega_2$, constant so as to enable positive spectral location of the detected sample resonance lines with respect to the resonance line of the reference material.

One solution is to use high quality crystal oscillators, one for the main R.F. generator for exciting the reference material, and one for each spectral range to be studied, but because of the inherent characteristics of crystal oscillators this solution does not provide acceptable long time stability.

Another solution is to regulate the ratio of magnetic field to radio frequency by deriving a signal from a resonance line in the spectrum of the nuclear species under examination, a method known as "homonuclear control." This method, however, is unsuitable when one wishes to examine inherently weak spectra, such as those of the carbon-13 nucleus, which have poor signal-to-noise characteristics and unfavorably long spin-lattice relaxation times. A more favorable method is that known as "heteronuclear control" whereby the field-frequency regulation signal is taken from a resonance line of one nuclear species while the resonance spectrum of other nuclear species are examined. It is then to use of this latetr method that the present invention is generally related.

OBJECTS OF THE INVENTION

It is therefore an object of the present invention to provide a simple and relatively inexpensive method and apparatus for enabling the selective scanning of multiple portions of the nuclear resonance spectrum of a sample using a single reference material.

Another object of the present invention is to provide a novel method and apparatus for enabling high resolution spectrometric study of a predetermined number of different resonance spectra of an analytical sample using a single reference material added to the sample material.

A further object of the present invention is to provide a method and apparatus for selectively setting and controlling the frequency of one or more variable frequency generators with respect to the frequency of another generator.

A still further object of the present invention is to provide a novel gyromagnetic resonance system wherein one or more resonance spectra of a given analytical sample may be selectively recorded by using a second radio frequency $\omega_2$ which is selected and automatically synchronized with the main radio frequency $\omega_1$ by merely depressing the proper combination of buttons on a control console.

These and other objects and advantages of the present invention will become apparent from the following description of a preferred embodiment of the invention illustrated in the accompanying drawings wherein:

IN THE DRAWING

Figure 10:
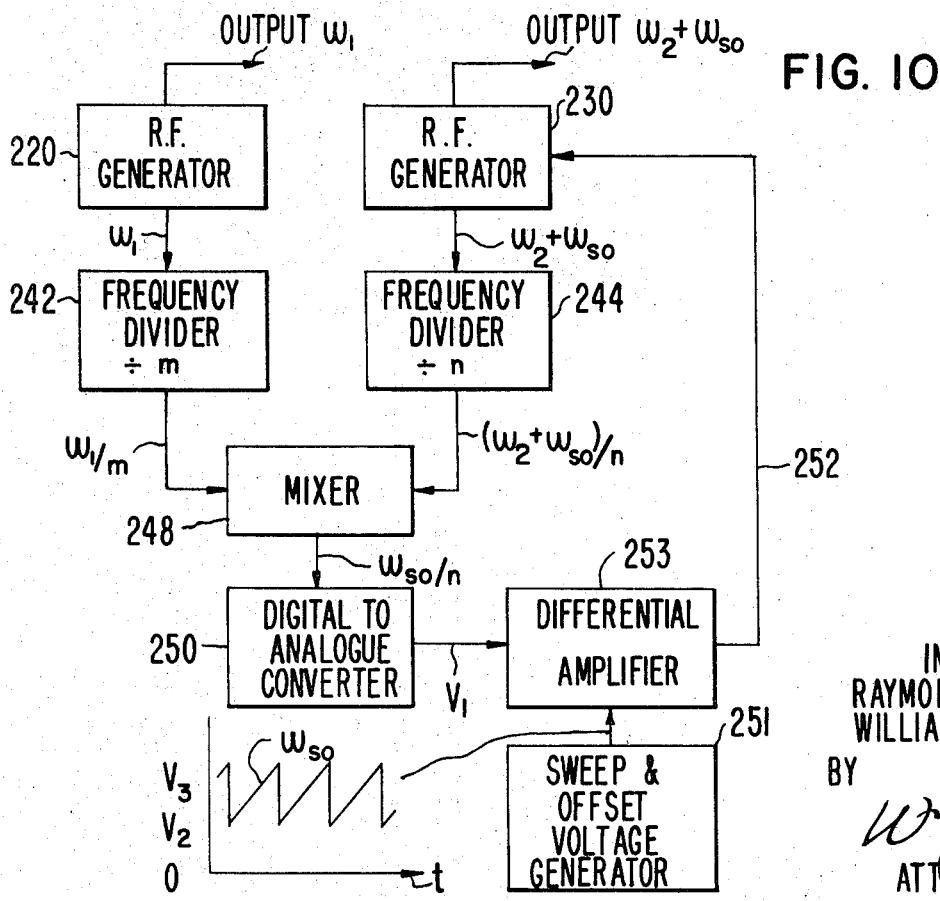
Figure 11:
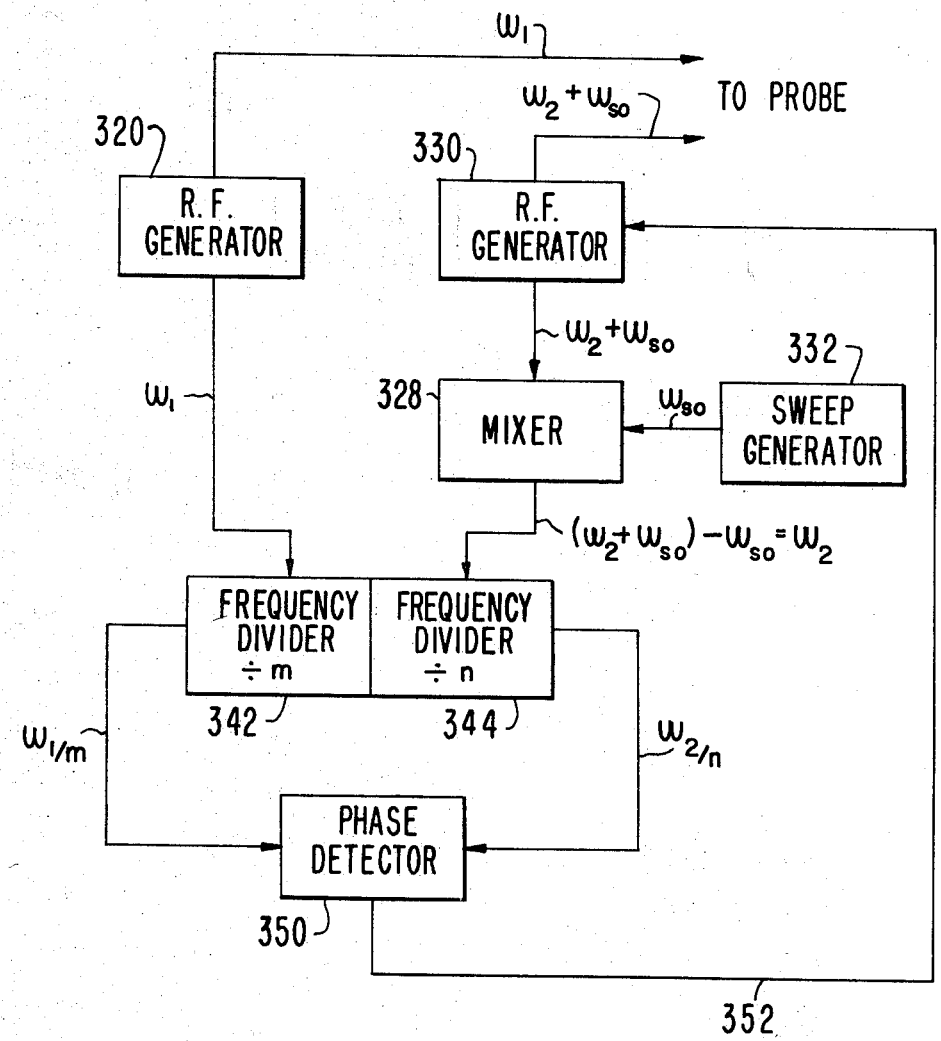

FIG. 1 is a spectral scale showing the relative positions of several atomic nuclei which may be inspected by use of the present invention, FIG. 2 is a block diagram of an NMR system including the present invention, FIG. 3 is a schematic representation showing a frequency control system according to the present invention, FIGS. 4 and 5 and 6 show wave forms of currents appearing in the system of FIG. 3, FIG. 7 illustrates charts which may be used in accordance with the present invention, FIG. 8 illustrates a plural frequency system in accordance with the present invention, FIG. 9 is an alternate embodiment of a frequency control apparatus in accordance with the present invention, FIG. 10 is a further embodiment of a frequency control apparatus in accordance with the invention, and FIG. 11 is another embodiment of a frequency control apparatus in accordance with the invention.

DESCRIPTION OF PREFERRED EMBODIMENTS OF THE INVENTION

Referring now to the drawing there is shown in FIG. 1 a spectral distribution of resonant nuclei for deuterium ($H^2$), carbon ($C^{13}$), boron ($B^{11}$), phosphorus ($P^{31}$), fluorine ($F^{19}$), and protons ($H^1$) plotted at their respective reasonant frequencies in the same chosen magnetic field. Also shown is the frequency locus of the reference material tetramethylsilane (TMS), a proton resonance line of TMS and a phosphorous reasonance spectrum of a particular sample material. The present invention provides a means for selectively inspecting any or all of the spectra shown in FIG. 1 using as the reference material TMS or any other suitable substance of any suitable nuclear species having a narrow reasonance line.

In FIG. 2 there is shown a gyromagnetic reasonance system in accordance with the present invention. The probe 10 containing the analytical sample and reference material is disposed between the pole faces 12 and 14 of an electromagnet 16. To the probe 10 there is connected by a line 18 a first R.F. generator 20 for providing an alternating magnetic field of frequency $\omega_1$ substantially equal to the gyromagnetic resonance frequency of TMS in a magnetic field H. Connected to the output of the probe 10 is a first receiver 22 for receiving and detecting the dispersion mode output signal from the probe 10. The detected signal is then used to energize the field stability winding 26 or electromagnet 16 in accordance with the phase of the dispersion sigal and thereby maintains the field frequency ratio constant.

Although not shown, field homogeneity control apparatus, such as disclosed in the U.S. patent application Ser. No. 372,626 filed June 4, 1964, by Nelson et al., may also be utilized in such a system for increased precision of measurement.

Also connected to probe 10 through lead 27, mixer 28 and lead 29 is a second R.F. generator 30 having a variable frequency $\omega_2$ suitable for exciting the nuclei of a selected group to resonance in the field H. In order to sweep the resonance spectrum over a selected range an audio oscillator 32 of frequency $\omega_m$ is shown connected to mixer 28 for modulating frequency $\omega_2$ of the second R.F. generator 30. As the spectral portion is swept the reasonance signal is received by a second receiver 34, detected by a detector 35 then transmitted to a recorder 36 for graphically displaying the resonance spectrum.

Leads 38 and 39 connect the outputs of frequency generators 20 and 30 respectively to a selectable frequency dividing network 40 including a first divider circuit 42 and a second divider circuit 44. Although only two divider networks are shown in this embodiment it will be apparent that a plurality of such networks could be tied together in the manner taught by the present invention. The respective output leads 46 and 48 of dividers 42 and 44 are connected to a detector 50 which detects a difference in frequency in the signals appearing in leads 46 and 48 and feeds a difference responsive error signal through lead 52 back to frequency generator 30 for controlling the output frequency generated thereby. It will now be apparent that the output signals generated by generators 20 and 30 are in effect locked together by means of the divider network 40 and the detector 50 so that the generator 30 will be forced to generate an output frequency which is equal to a fractional multiple of the frequency of generator 20 as determined by the ratio of the set value $n$ of divider 44 to the set value $m$ of divider 42, i.e., $$\omega_{30} = \frac{n}{m} \times \omega_{20}$$

Referring now to FIG. 3 there is shown a more detailed schematic of the frequency conrtol circuit enclosed by the dashed lines 54 of FIG. 2. Frequency reduction-pulse conversion units 56 and 57 are provided for converting the R.F. sinusoidal signal of generators 20 and 30 respectively, into pulse configuration signals and for reducing the frequencies of the signals to within the operable range of dividers 58 and 59. The dividers 58 and 59 may be of any suitable design but as herein shown are each comprised of 8 serially connected flip-flops 54. A switching console 60 is provided having two bays 62 and 63 of 8 switching devices 66 each for enabling the selective control of the dividers 58 and 59.

The flip-flops 54 of dividers 58 and 59 are connected to the inputs of AND gates 64 and 65 respectively, which energize one-shot multivibrators 68 and 69 to provide pulse outputs on lines 70 and 71 in response to the cyclic outputs of dividers 58 and 59. The pulses appearing on lines 70 and 71 are returned through the switches 66 of console 60 so as to reset the flip-flops 54 on completion of each counting cycle. The pulses are also passed through leads 46 and 48 to the detector 50 which includes a set-reset flip-flop 72 which generates pulses having widths proportional to the phase difference between the input pulses and integrator 74 the output of which is proportional to the area under the pulses generated by flip-flop 72.

The output of integrator 74 is connected by a line 52 to a variable reactor 75 for controlling the frequency $\omega_2$ generated by generator 30. It will thus be apparent that by choosing a particular combination of the positions of switches 66 in console bay for example, one can cause the combination of divider 58 and AND gate 64 to produce 1 output pulse for every $m$ input pulse where $m$ can be any number between 1 and 256. The operation can otherwise be thought of a counting of every $m$th pulse received. Similarly by choosing a particular combination of switches 66 in bay 63 one can cause every $n$th pulse received to be "counted." Therefore, in order to control the frequency of generator 30 with respect to generator 20 using the circuit of FIG. 3 all one need do is choose a fraction having a numerator $n$ and a denominator $m$, each less than or equal to 256, which is proportional to the ratio of the frequency $\omega_1$ of generator 20 to the desired frequency $\omega_2$ of generator 30. Since the experimentor can determine the resonance frequencies of the nuclei of the reference material and the nuclei which he desires to inspect in any given magnetic field H he can readily choose a fraction as described above which is proportional to the ratios of the two frequencies.

Using a computer to sample various combinations of numbers between 1 and 256 which were acceptable as relating a first resonance frequency to a second resonance frequency the following fractions were chosen for the respective nuclei:

| Reference material | Nuclear species | Ratio $\frac{\omega^2}{\omega^1}$ | Divider setting Div. 58 | Div. 59 |
|---|---|---|---|---|
| TMS | Deuterium ($H^2$) | 35/228 | 228 | 35 |
| TMS | Carbon ($C^{13}$) | 44/175 | 175 | 44 |
| TMS | Boron ($B^{11}$) | 77/240 | 240 | 77 |
| TMS | Phosphorus ($P^3$) | 100/247 | 247 | 100 |
| TMS | Fluorine ($F^{19}$) | 143/152 | 152 | 143 |

OPERATION OF THE DEVICE

The operation of the device can perhaps best be described by supposing that one wished to record the fluorine spectra of a given sample material using the proton of TMS as the reference material in a gyromagnetic spectrometer having an R.F. generator 20 operating at 100 mHz. The magnetic field H established by electromagnet 16 would be set at a value which would excite the protons of the TMS to resonance as determined by the ratio: $H = \omega_{20}/\gamma_{TMS}$; and the ratio of field to frequency would thereafter be automatically maintained constant by the field-frequency control system.

Referring now to the preceding table the numbers 152 and 143 are found to represent the optimum settings for inspecting the fluorine spectrum. The proper combination of switch actuators 76 in bay 62 is then chosen so as to position the switches 66 such that the divider 58 is set to "count" every 152nd pulse received from generator 20 and switch actuators 77 in bay 63 are set to cause the divider 59 to "count" every 143rd pulse received from generator 30. When 152 pulses have passed into divider 58 a "1" will appear on each of the leads 61 to AND gate 64 and a voltage will be caused at the output thereof to trigger the one-shot multivibrator 68 each time 152 pulses are received by the divider 58. Accordingly, a chain of pulses such as illustrated in FIG. 4 proportional to the frequency $\omega_1$ is generated at the output of multivibrator 68 and is passed through leads 70 and 46 to the set-reset flip-flop 72. Likewise, a combination of the actuators 77 in bay 63 is chosen which causes the dividers 59 to "count" one each time 143 pulses are received from generator 30 and a chain of pulses, such as shown in FIG. 5, is generated at the output of the multivibrator 67 which is proportional to the frequency $\omega_2$ of generator 30. Therefore, because of the division factors of dividers 58 and 59 the frequencies of the pulsed signals appearing in leads 46 and 48 will be equal when $$\omega_2 \times \frac{143}{152} \times \omega_1$$

The flip-flop 72 operates such that upon receiving a pulse from line 46 it is turned on and remains on until a pulse is received from line 48 to turn it off. It then remains off until another pulse is received from line 46. Hence, if the signals in lines 46 and 48 are as depicted in FIGS. 4 and 5 a series of pulses as shown in FIG. 6 will be generated having widths proportional to the time spacing between the pulses received from divider networks 42 and 44.

Referring now to FIGS. 4(b) and 5(b) there are shown representations of the pulses received by flip-flop 72 from lines 46 and 48 respectively when $$\omega_2 \times \frac{143}{152} \times \omega_1$$

and in FIG. 6(b) there is shown the corresponding output of flip-flop 72. In FIGS. 4(a), 5(a) and 6(a) there are shown the respective wave forms when $\omega_2$ tends to drift below the value $$\frac{143}{152} \times \omega_1$$

causing a relative phase change between the signals in FIGS. 4(a) and 5(a), and in FIGS. 4(c), 5(c) and 6(c) there is shown the respective wave forms when $\omega_2$ tends to drift above the value $$\frac{143}{152} \times \omega_1$$

By comparing these wave foms it is easily seen that an integration of the output wave form of flip-flop 72 will yield an error signal proportional to the phase shift between the wave forms on leads 46 and 48, which can be used to control generator 30. Such a signal is provided by integrator 74 and is conducted through line 52 to variable reactor 75 for controlling the output frequency $\omega_2$ of generator 30. The frequency $\omega_1$ and the derived frequency $\omega_2 + \omega_m$ are then applied to probe 10 and the system will record the desired resonance spectra.

In view of the preceding disclosure by way of example it should be apparent that by simply choosing the proper combination of actuators 76 and 77 on console 60 one can inspect the resonance spectra of any desired nuclei using a single sample with reference material added and be assured that there will be no troublesome drift or lack of control between the two frequency sources 20 and 30, and since the field H is accordingly "locked" to the frequency of generator 20 the position of any resonance line along the spectral scale can easily be determined.

In order to further simplify the manner of setting the console 60 for multiple spectra inspection it is contemplated that the actuators 76 and 77 might consist of translucent buttons having lighted and unlighted switch positions. Charts could then be prepared such as illustrated in FIG. 7 showing a particular combination of switches to be actuated for each combination of nuclei and the experimentor could simply select the chart corresponding to the nuclei he wished to inspect and actuate the buttons 76 and 77 to match the representation shown on the chart.

It is also contemplated that the generator 30 could be comprised of several precision frequency sources and the control console could be used not only to switch among these several sources but to maintain incremental control over the respective output frequencies of the precision sources.

For the purposes of gyromagnetic resonance, it is often desirable not merely to synchronize two frequencies in a constant proportion $m/n$ but in addition to vary one of the frequencies $\omega_2$ a small amount from the value $$\omega_1 \times \frac{n}{m}$$

to provide sweep and offset in the spectrum to be examined. In the alternate embodiments shown in FIGS. 9, 10 and 11, means are disclosed which sacrifice a minimum of the inherent stability of the oscillator $\omega_2$ which in certain applications may be quite insignificant in light of the advantages obtained through the reduction in complexity of the required operative components.

In FIG. 9 there is shown a first R.F. generator 120, for generating a first frequency $\omega_1$, connected to a frequency divider 142 which divides frequency $\omega_1$ by an integer $m$. A second R.F. generator, which initially generates a second frequency $\omega_2$, is connected to a second frequency divider 144 which divides the generator output by a second integer $n$. A sweep and offset generator 145, which generates a frequency $\omega_{so}$, is shown connected to another frequency divider 146 which divides $\omega_{so}$ by the second integer $n$. The output frequencies of dividers 142 and 144 respectively are fed into a digital mixer 148 which produces an output frequency equal to the deviation of the output of generator 130 from the predetermined $\omega_2$ and which may be expressed as $\omega_{so}/n$. The output of frequency divider 145 which also produces a signal $\omega_{so}/n$ and the output of the digital mixer 148 are fed into a phase detector 150 which provides a D.C. error signal proportional to the phase difference between the two signals. This error signal is fed back to generator 130 for providing sweep and offset control of the generator. The output of the R.F. generator 130 is therefore equal to $\omega_2 + \omega_{so}$ where $\omega_{so}$ is the sweep and offset frequency provided by generator 146.

In accordance with another embodiment of the invention, there is shown in FIG. 10 a first R.F. generator 220, which generates a first frequency $\omega_1$. The output of generator 220 is connected to a frequency divider 242 which divides the frequency $\omega_1$ by an integer $m$ to provide an output equal to $\omega_1/m$ which is fed into one side of the mixer 248. A second R.F. generator 230 is connected to a frequency divider 244 which divides the output of generator 230 by a predetermined integer $n$. The output of divider 244 is also connected to the mixer 248. The output of mixer 248 is then supplied to a digital-to-analog converter 250 which produces an analog voltage $V_1$ which is proportional to the difference between the frequencies of the signals received from dividers 242 and 244. A sweep and offset voltage generator 251 is provided which generates a frequency $\omega_{so}$. The output of generator 251 and the output $V_1$ of converter 250 are connected to a differential amplifier 253 which produces a control signal in line 252 for controlling the output of R.F. generator 230.

In a still further embodiment, as illustrated in FIG. 11, the mixer 328 is interposed between the R.F. generator 330 and the frequency divider 344 so as to subtract the sweep and offset frequency $\omega_2+\omega_{so}$ generated by the frequency generator 330, thus presenting only the frequency $\omega_2$ to the divider 344. This sweep generator 332 provides the frequency $\omega_{so}$. In this embodiment, the frequency division and control process is substantially the same as in the embodiment of FIG. 2 but the second generator 330 now provides the composite excitation signal $\omega_2+\omega_{so}$ directly to the probe.

The output of the dividers 342 and 344 are connected to phase detector 350 where a control signal is generated and conducted through line 352 to generator 330 for regulation thereof with respect to the frequency of generator 320.

The frequency control apparatus described herein can likewise be used in any device or system which requires accurate control between any of a plurality of frequency sources and should not be interpreted as limited to use in the particular system shown. In FIG. 8, for example, there is schematically illustrated a similar system for simultaneously selecting and regulating two frequencies $\omega_2$ and $\omega_3$ with respect to a control frequency $\omega_1$.

Many alterations and modificatons of the invention will be apparent to those of skill in the art after having read the foregoing description and it is understood that this description is for puproses of illustration only and is in no manner intended to be limiting in any way and that we intend that the appended claims be interpeted as covering all modifications which fall within the true spirit and scope of our invention.

We claim:

1. In a gyromagnetic resonance apparatus including a means for establishing a unidirectional magnetic field, a sample supporting probe means disposed in said magnetic field, means for supplying R.F. energy to said probe at an angle of substantially 90° to said magnetic field, said last named means including means for providing a first frequency and at least one other frequency, and control means for said last named means comprising a first divider means for dividing said first frequency by a first predetermined divisor $m$, at least one other divider means for dividing said other frequency by another predetermined divisor $n$, means responsive to the outputs of said divider means for detecting a difference in said divided outputs and for providing a voltage signal responsive thereto, and means responsive to said voltage signal for controlling said other frequency so as to maintain a predetermined ratio between said first and other frequencies, said means for providing said other frequency includes a variable frequency R.F. generator, a sweep generator for generating a sweep frequency, and a mixer for mixing a sampled output of said R.F. generator with the output frequency of said sweep generator to subtract the sweep frequency from the sampled output frequency of said R.F. generator to obtain a remainder frequency which is fed to said other divider means, and wherein the signal voltage output of said control means is connnected to said variable frequency R.F. generator for controlling the frequency thereof.

2. In a gyromagnetic apparatus including means for selectively energizing any of several different types of nuclei in a given analytical sample while simultaneously energizing the nuclei of a reference material, said means comprising:

(1) a first frequency source for exciting certain nuclei of said reference material, (2) at least one other frequency source for exciting certain other nuclei in a sample material, (3) means responsive to said frequency sources for providing output signals proportional to the frequencies of said sources divided by different predetermined numbers respectively, (4) means for comparing the differences in phase between said output signals and for providing error signals proportional thereto for controlling the generated frequency of said other frequency source, said other frequency source includes a variable frequency R.F. generator, a sweep generator for supplying a sweep frequency, and a mixer for coupling said sweep generator and said R.F. generator to said frequency source responsive means, and wherein said error signals are used to control the frequency of said variable frequency R.F. generator.

3. In a gyromagnetic resonance apparatus including a means for applying a polarizing magnetic field to a sample located in said field, signal generator means for applying an exciting radio frequency field to said sample to obtain a magnetic resonance signal therefrom and means for detecting such resonance signal, wherein said signal generator means includes a first R.F. generator and a second R.F. generator, divider means connected to the outputs of said generator means for dividing the respective outputs thereof by predetermined different integer values, detector means responsive to the outputs of said divider means for detecting the phase difference of the signals received from said divider means and deriving an analog signal proportional to a sweep frequency component of said second R.F. generator, sweep signal generator means for generating an analog sweep signal proportional to the sweep frequency component of said second generator, and differential amplifier means having inputs connected to said detector means and said sweep generator means and providing a control signal for controlling the signals generator by said second R.F. generator.

4. In a heteronuclear gyromagnetic resonance spectrometer, means for applying a polarizing magnetic field to a control sample of a first nuclear species having a first gyromagnetic ratio $\gamma_1$ and to a sample under analysis of a second nuclear species having a second gyromagnetic ratio $\gamma_2$, a signal generator means for applying exciting radio frequency fields to said samples at first and second frequencies $\omega_1$ and $\omega_2$ to excite magnetic resonance of the respective samples, means for detecting such resonance signals, said signal generator means including a first radio frequency generator for generating said first radio frequency $\omega_1$ and a second variable radio frequency generator for generating said second radio frequency $\omega_2$, first and second frequency divider means for separately dividing samples of the first and second radio frequencies $\omega_1$ and $\omega_2$ by certain predetermined integers $m$ and $n$, respectively, to obtain separate outputs proportional to $\omega_1/m$ over $\omega_2/n$ where the ratio $n/m$ is approximately equal to the ratio $\gamma_1/\gamma_2$, comparing means for comparing the separate outputs $\omega_1/m$ and $\omega_2/n$ to obtain an error signal, feedback means for applying the error signal to said second variable frequency radio frequency generator for relating the second frequency $\omega_2$ to the first frequency $\omega_1$ via the ratio of $\gamma_2/\gamma_1$, sweep generator means for sweeping the frequency $\omega_2$ of the variable frequency generator by a relatively small sweep frequency $\omega_{so}$, said sweep generator means generating a sweep signal which is fed into said comparing means such that a sweep frequency signal component is produced in the error signal as fed back to said variable frequency radio frequency generator.

5. In the apparatus of claim 4 wherein said comparing means includes a mixer for mixing the separate outputs of said first and second dividers to obtain an output proportional to $\omega_{so}/n$, and wherein said sweep generator produces a second output proportional to $\omega_{so}/n$ and wherein said comparing means includes an error detector for comparing the two outputs proportional to $\omega_{SO}/n$ as derived from the mixer and sweep generator respectively to produce the signal to be fed back to said second variable frequency radio frequency generator.

6. The apparatus of claim 5 wherein said mixing means includes a digital-to-analog converter for producing an analog signal output proportional to $\omega_{SO}/n$ and wherein said sweep generator produces an analog output component proportional to $\omega_{SO}/n$, and wherein said comparing means comprises a differential amplifier for comparing the two analog signals to obtain the error signal to be fed back to said variable frequency generator.

7. The apparatus of claim 4 wherein said comparing means includes a mixer for mixing the output frequency of said second variable frequency generator with the output frequency $\omega_{SO}$ of said sweep generator to derive a difference frequency equal to $\omega_2$ which is thence fed to said second divider for division by $n$ to obtain a signal proportional to $\omega_2/n$ and wherein said comparing means includes a detector for comparing the $\omega_2/n$ signal with an $\omega_1/m$ signal derived from said first divider to produce the error signal to be fed back to said second variable frequency radio frequency generator for controlling the output frequency thereof.

References Cited

UNITED STATES PATENTS

| 3,319,178 | 5/1967 | Broadhead | 331—25 |
| 3,375,448 | 3/1968 | Newman | 331—18 |
| 3,413,565 | 11/1968 | Babany | 331—25 |

OTHER REFERENCES

Frequency Swept and Proton Stabilized NMR Spectrometer for All Nuclei Using a Frequency Synthesizer—Baker and Burd—Rev. of Sci. Instr.—34(3), March 1963 —pp. 238–242.

RUDOLPH V. ROLINEC, Primary Examiner

M. J. LYNCH, Assistant Examiner

U.S. Cl. X.R.

331—178